(12) United States Patent
Lin

(10) Patent No.: US 6,379,605 B1
(45) Date of Patent: Apr. 30, 2002

(54) PROCESS FOR PRODUCING A 3-LAYER CO-EXTRUDED BIAXIAL-ORIENTED POLYPROPYLENE SYNTHETIC PAPER AND TRANSPARENT FILM FOR IN-MOLD LABEL

(75) Inventor: Allen Fong-Chin Lin, Taipei (TW)

(73) Assignee: Nan Ya Plastics Corporation, Taipei (TW)

( * ) Notice: Subject to any disclaimer, the term of this patent is extended or adjusted under 35 U.S.C. 154(b) by 0 days.

(21) Appl. No.: 09/422,727

(22) Filed: Oct. 22, 1999

(51) Int. Cl.[7] .......................... B29C 44/20; B32B 31/30
(52) U.S. Cl. .................. 264/414; 156/229; 156/244.17; 264/45.9; 264/173.14; 264/173.15; 264/288.8; 264/423; 264/469
(58) Field of Search ................................. 264/414, 423, 264/469, 173.14, 173.15, 288.8, 45.9; 156/244.17, 229

(56) References Cited

U.S. PATENT DOCUMENTS 5,552,011 A * 9/1996 Lin ........................ 156/244.17
6,332,940 B1 * 12/2001 Lin ............................. 156/229

* cited by examiner

Primary Examiner—Allan R. Kuhns
(74) Attorney, Agent, or Firm—Bacon & Thomas

(57) ABSTRACT

Disclosed is a process for producing a three layers co-extrusion biaxially oriented polypropylene (hereinafter as BOPP) synthetic paper and transparent film for in-mold label. More particularly, the invention relates to a process for producing a three layers biaxially oriented PP synthetic paper by means of three layers co-extrusion wherein three different PP resin compositions are separately extruded by one primary and two secondary extruders first, and then are co-flowed by a same T-die to form a three layers coating sheet. Thus, the three layers structure of said three layers co-extrusion coating sheet can be made into resin layer/foamed intermediate or resin layer/resin layer, and then through cooling, biaxial orientation, corona treatment and winding to form a three layers co-extrusion synthetic paper of haze paper sheet layer/foamed intermediate layer/adhesive layer, gloss paper sheet layer/foamed intermediate layer/adhesive layer, or a three layers co-extrusion synthetic transparent film of resin layer/resin layer/adhesive layer

2 Claims, 3 Drawing Sheets

Fig. 1-a
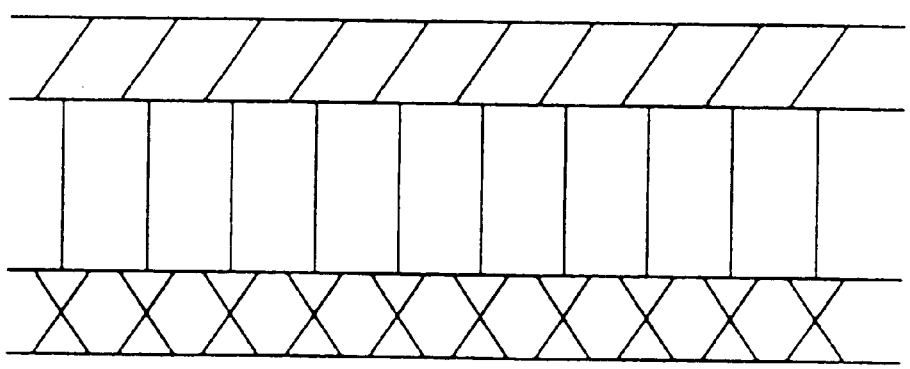
Fig. 1-b
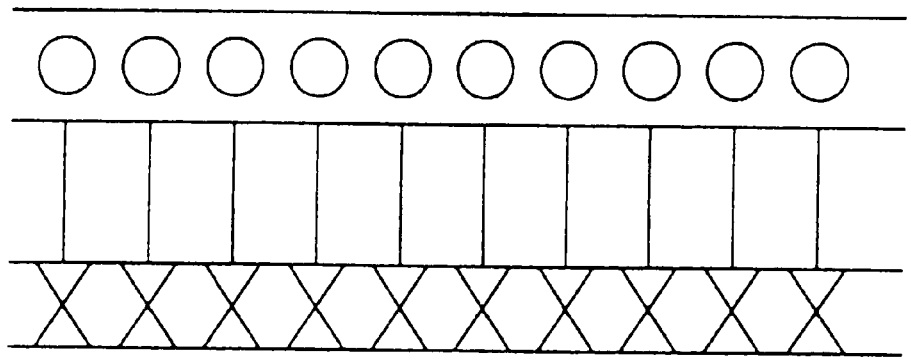

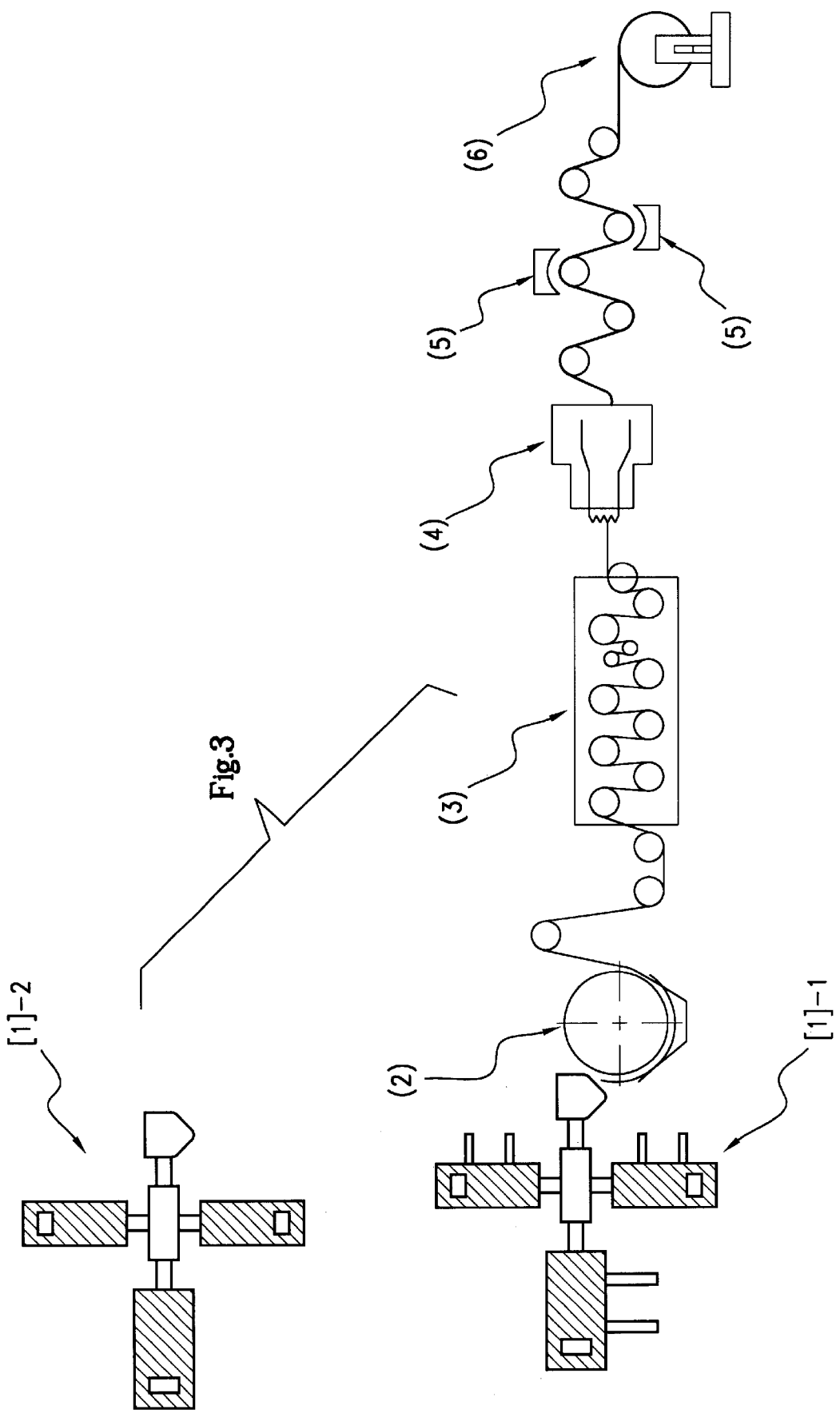

PROCESS FOR PRODUCING A 3-LAYER CO-EXTRUDED BIAXIAL-ORIENTED POLYPROPYLENE SYNTHETIC PAPER AND TRANSPARENT FILM FOR IN-MOLD LABEL

FIELD OF THE INVENTION

This invention relates to a process for producing a 3-layer co-extruded biaxially-oriented polypropylene (hereinafter as BOPP) synthetic paper and transparent film for in-mold label. More particularly, the invention relates to a process for producing a 3-layer biaxially-oriented PP synthetic paper by means of 3-layer co-extruded wherein three different PP resin compositions are separately extruded by one primary and two secondary extruders first, and then are co-flowed by a same T-die to form a 3-layer coating sheet. Thus, the 3-layer structure of said 3-layer co-extruded coating sheet can be made into resin layer/foamed intermediate or resin layer/resin layer, and then through cooling, biaxial orientation, corona treatment and winding to form a 3-layer co-extruded synthetic paper of haze paper sheet layer/ formed intermediate layer/adhesive layer, gloss paper sheet layer/foamed intermediate layer/adhesive layer, or a 3-layer co-extruded synthetic transparent film of resin layer/resin layer/adhesive layer.

DESCRIPTION OF THE PRIOR ART

Typically, the label for use in the container of edible(such as beverage, pickle), pharmacopoeia(such as vitamin, antiseptic), hygienic product(shampoo, body lotion, washing liquid) is the type of back coating label(a product obtained by laminating with releasing paper back coated with adhesive), first it is through the print process, and then adhere the label on the bottle, jar, cap of the container by labeling machine or hand. However, the materials of the label paper depend on the purpose (for example waterproof for bathroom, refrigerator, sink), the recycle operation (for example the scrap of the label paper left on the waste plastic bottles will interfere the recycle operation), and the quality demand (for example the print of the label paper is not fine enough). Nowadays the paper made of nature pulp is replaced by the plastic materials (such as synthetic paper of PVC, PP, PET, PE, etc). When adhering the label by labeling machine or hand, the manufacturer has to buy the equipment for labeling or spends the cost of human, as well as the cost of material and manufacture of the back coating label is enormous. Additionally, the releasing paper after labeling is a composite material consisted of paper and PE with releasing agent, it is only treated as waste and can not be recycled, and increases the load of environment and social cost.

Though, now a synthetic paper for in-mold label is available and has been provided by Nippon Oushi Yuka Company, Ltd., in order to improve the problem of cost and environment of the labeling equipment and the back coating label. The said in-mold label is first pre-treated with dry hot melt adhesive on the rear surface, and printed, positioned in the mold by means of auto-robot attached to the equipment of bottle making (such as blow molding machine, injection molding machine). Then it is integrated with the injection molding plastic material (such as PP, LPPE, HDPE), and using the pre-treated dry hot melt adhesive adhere to the bottles and jars. The surfaces of the finished bottles, jars are smooth, like printing directly on the curved surfaces of the bottles and jars, and it is difficult to feel the existence of the label.

According to tn the above mentioned synthetic paper for in-mold label by Nippon Oushi Yuka Company, Ltd., the manufacturer only need invest costs in the auto-robot and the mold adaptation, the costs of the equipment and human for labeling can be saved. The cost of the synthetic paper with the pre-treated dry hot melt adhesive is twice as many as the cost of back coating label, but it will be benefitted for the long-term user. However for the bottle manufacturer and edible, pharmacopoeia, hygienic product manufacturer, the marketplace is very keen, the sale cycle of the product is not easy to predict, so the manufacturer does not tend to this investment, it is the major reason why the in-mold label cannot be replaced substantially with the back coating label. Only while the market price of the in-mold label is substantially cheaper than the back coating label, the manufacturers are induced to develop in-mold label.

SUMMARY OF THE INVENTION

It is an object of this invention to provide a novel process for producing a 3-layer co-extruded biaxially-oriented polypropylene (BOPP) synthetic paper and transparent film for in-mold label.

In view of the foregoing, this invention is intended to obviate the above-mentioned problems, the company which employs the inventors has been devoted to develop the BOPP synthetic paper, and constantly test and research the paper for in-mold label, it is known if the paper for in-mold label was not required pre-treating with dry hot melt adhesive on the rear surface, and could adhere securely to the material of the bottle or jar (such as PP, LPPE, HDPE), such that the production cost would be reduced and enhance the market competence. Naturally, the manufacturers are induced to invest in the auto-robot and the mold adaptation.

Accordingly, this invention has for its object to provide a synthetic paper and transparent film having 3-layer structure, having haze paper layer/foamed intermediate layer/adhesive layer, or gloss paper layer/foamed intermediate layer/adhesive layer, wherein the material of the adhesive layer such as PP, LPPE, HDPE can adhere integrally to the material of the bottle or jar in the mold of injection molding or blow molding, by means of chemical bond, and the hot melt adhesive is not necessary. Therefore the benefit of the product can be shown as follows:

(1) saving the costs using the releasing paper (the paper treated with PP coating film and releasing agent);

(2) saving the costs of the gluing of the releasing paper; and (3) saving the costs of the auto-labeling equipment or labeling by hand.

The biaxial-oriented polypropylene (BOPP) synthetic paper according to this invention has 3-layer structure, wherein the paper layer having white haze or transparent gloss paper layer suitable for printing, and has printing effect of aesthetic design; the foamed intermediate layer mainly playing the function for significantly decreasing the specific gravity, and providing whiteness and un-transparent of design; and the adhesive layer is used for adhering integrally to the material of bottle and jar in the mold. The 3-layer structure of the biaxial-orientation for in-mold label according this invention is made by means of three extruders in the manner of 3-layer co-extrusion. According to the experience of the applicant for several years, the extruder device can be designated as follows:

(1) Typical single screw extruder: it has to use high-class filler master batch, and the product speed may be restricted.

(2) Single screw extruder of hopper venting type: it has to use high-class filler master batch, but the product speed can be raised a little (3) Single screw extruder of cylinder venting type: it has to use high-class filler master batch, and both the product speed and the addition quantity may not be restricted.

(4) Twin screw extruder of cylinder venting type with side feeding hoppers: it can use directly powder filler, and both the product speed and the addition quantity may not be restricted.

Basing on the costs and the stable quality of special machine, the production in this company mainly use the twin screw extruder of cylinder venting type with side feeding hopper, but any process according this invention will not apply additionally the adhesive, and the label can be adhered integrally to the container of the bottle and jar.

The biaxial-oriented polypropylene (BOPP) transparent film according to this invention has 3-layer structure, wherein the main material of the upper and intermediate layers is polypropylene or co-polymer of polypropylene; the lower adhesive layer is made by the same material as the bottle and jar, in order to increase integrally adhesive in the mold. Any type of the above mentioned extruder can be combined to co-extrude the 3-layer co-extrusion transparent film, the production in this company mainly use the typical single screw extruder, but any process according to this invention will not apply additionally the adhesive, and the label can be adhered integrally to the bottle and jar.

BRIEF DESCRIPTION OF DRAWING

Referring to the attached drawings, in FIG. 1, there is shown two kinds of 3-layer co-extrusion BOPP synthetic paper for in-mold label according to this invention, which is made by means of the twin screw extruder of cylinder venting type with side feeding hoppers, wherein:

FIG. 1-*a* represents the 3-layer structure of BOPP synthetic paper having haze paper layer/foamed intermediate layer/adhesive layer; and FIG. 1-*b* represents the 3-layer structure of BOPP synthetic paper having gloss paper layer/foamed intermediate layer/adhesive layer.

In FIG. 3, there is shown the processing device of this invention, wherein:

Figure 2:
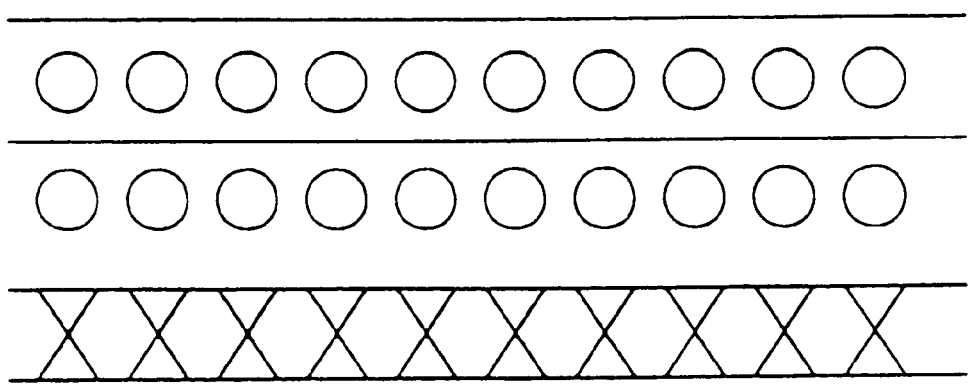
In FIG. 2, there is shown the a 3-layer co-extrusion BOPP synthetic transparent film for in-mold label according to this invention, which is made by means of the typical single screw extruder, represents the 3-layer structure of BOPP synthetic transparent film having resin layer/resin layer/adhesive layer.

(1)-1 represents extruding device, which is the twin screw extruder of cylinder venting type with side feeding hoppers for manufacturing the BOPP synthetic paper (1)-2 represents extruding device, which is the typical single screw extruder for manufacturing the BOPP synthetic transparent film (2) represents cooling and shaping device (3) represents longitudinal orientation device (4) represents lateral orientation device (5) represents corona treatment device (6) represents winding device

DETAILED DESCRIPTION OF THE INVENTION

The device in pursuance of the process of this invention are further described as follows:

Extruding device (numeral 1-1 in FIG. 3), which is the twin screw extruder of cylinder venting type with side feeding hoppers for manufacturing the BOPP synthetic paper:

It comprise one twin screw primary extruder of cylinder venting type with two side feeding hoppers, and two twin screw secondary extruders of cylinder venting type with two side feeding hoppers, whose temperature conditions vary with the ingredients of resin composition, MFI(melt flow index), crystallinity, additives, production line speed (winding speed) and temperature of product that normally set in the range between 180–280° C.

Extruding device (numeral 1-2 in FIG. 3), which is the typical single screw extruder for manufacturinge the BOPP synthetic transparent film:

It comprise one single screw primary extruder and two single screw secondary extruders, whose temperature conditions vary with the ingredients of resin composition, MFI(melt flow index), crystallinity, additives, production line speed (winding speed) and temperature of product that normally set in the range between 200–280° C.

Cooling and shaping roller device (numeral 2 in FIG. 3):

It adopts the water cooling or air cooling device to cool and form the three layers co-extrudate of high temperature between 180° C. and 280° C. The control of cooling temperature in this process is quite important, which promises the success of the steps of following process. The cooling temperature is normally set at 15–60° C. being adjustable depending on the thickness of synthetic paper and the speed of production line.

Longitudinal orientation device (numeral 3 in FIG. 3):

The cooled and formed sheet is fed in this device for preheating to soften the paper sheet at 115–150° C. (depending on the thickness of required paper sheet and the speed of production line), and then be oriented in two steps with low and high speed so as to enhance the longitudinal mechanical strength of coating layer which being then tempered and formed. In general, the longitudinal draw ratio is set at 3~6 times.

Lateral orientation device (numeral 4 in FIG. 3):

The thinner paper sheet formed through the foregoing longitudinal orientation treatment is preheated and softened at 140~195° C. (depending on the thickness of paper sheet and the speed of production line) and then laterally oriented for drawing 5~12 times for a lateral orientation, and finally tempered and formed so as to partially reduce the dimension of coating layer for its stability. The lateral drawing ratio depends on the required feature of product. The expression drawing times as used throughout the specification refers to a drawing ratio as would be appreciated by one of ordinary skill in the art.

Corona treatment (numeral 5 in FIG. 3):

This treatment for a single side surface or double side surfaces is to improve the surface characteristics of coating layer for enhancing the adhesion between coating layer surface and paper surface treating agent, where the device of high frequency discharging with a power of 20~120 KW is used (depending on the speed of production line) so as to obtain a surface wetting tension of 36~48 dyne/cm$^2$.

Winding device (numeral 6 in FIG. 3):

The coating layer of present invention is taken up to be a end product with 8 M width by a tubular device, and then can be striped into thickness of 25~250 $\mu$m rolled or sheeted product.

For the understanding of technical content of this invention, here provide the description on the aspects including polypropylene resin composition, processing (including extrusion, 3-layer co-extrusion, cooling, biaxial-orientation, corona treatment, winding) as follows.

The biaxial oriented polypropylene (BOPP) synthetic paper according to this invention has three layer structure, the PP resin composition used for the haze/gloss paper layer is extruded by a #1 twin screw secondary extruder of cylinder venting type with side feeding hopper. The said polypropylene resin composition including the polypropylene (PP) resin of 97~50% weight having high crystallinity of isotacticity above 97%, polyethylene resin of 0~30% weight, antiblocking agent of 0~5% weight, ultraviolet absorbent of 0~5% weight and antistatic agent of 0~3% are uniformly blended into the feeding hopper of the #1 twin screw secondary extruder, while calcium carbonate of 0~50% weight, titanium oxide of 0~20% weight are uniformly blended into the #1 twin screw secondary extruder from side feeding hopper; the PP resin composition used for the foamed intermediate layer is extruded by a twin screw primary extruder of cylinder venting type with side feeding hopper. The said polypropylene resin composition including the polypropylene (PP) resin of 95~45 % weight having high crystallinity of isotacticity above 97%, and antistatic agent of 2~5% are uniformly blended into the feeding hopper of the twin screw primary extruder. While calcium carbonate of 5~50% weight, titanium oxide of 5~10% weight are uniformly blended into the twin screw primary extruder from side feeding hopper; and the PP resin composition used for the adhesive layer is extruded by a #2 twin screw secondary extruder of cylinder venting type with side feeding hopper. The said polypropylene resin composition including the polypropylene (PP) resin of 100~50% weight having high crystallinity of isotacticity above 97%, polyethylene resin of 0~30% weight, and high density polyethylene resin of 0~20% weight are uniformly blended into the feeding hopper of the #2 twin screw secondary extruder; The three compositions are extruding separately from one primary and two secondary twin screw extruders to be co-flowed and extruded through a same T-die to form a coating sheet of three layers, thus the three layers structure of said three layers co-extrusion coating sheet can be made into resin layer/foamed intermediate layer/adhesive layer, and then through biaxial orientation, corona treatment and winding to form a three layers co-extrusion biaxially oriented polypropylene synthetic paper of haze or gloss paper sheet layer/foamed intermediate layer/adhesive layer for in-mold label (as shown in the FIG. 1).

The biaxial oriented polypropylene (BOPP) synthetic transparent film according to this invention has also three layer structure, the PP resin composition used for the upper resin layer is extruded by a #1 single screw secondary extruder. The said polypropylene resin composition including the polypropylene (PP) resin of 97~77% weight having high crystallinity of isotacticity above 97%, polyethylene resin of 0~20% weight, and antiblocking agent of 3~5% weight are uniformly blended into the feeding hopper of the #1 single screw secondary extruder; the PP resin composition used for the intermediate resin layer is extruded by a single screw primary extruder. The said polypropylene resin composition including the polypropylene (PP) resin of 97~87% weight having high crystallinity of isotacticity above 97%, polyethylene resin of 0~10% weight, and antistatic agent of 3~5% are uniformly blended into the feeding hopper of the single screw primary extruder; and the PP resin composition used for the lower adhesive layer is extruded by a #2 single screw secondary extruder. The said polypropylene resin composition including the polypropylene (PP) resin of 100~50% weight having high crystallinity of isotacticity above 97%, polyethylene resin of 0~30% weight, and high density polyethylene resin of 0~20% weight are uniformly blended into the feeding hopper of the #2 single screw secondary extruder; The three compositions are extruding separately from one primary and two secondary twin screw extruders to be co-flowed and extruded through a same T-die to form a coating sheet of three layers, thus the three layers structure of said three layers co-extrusion coating sheet can be made into resin layer/resin layer/adhesive layer, and then through biaxial orientation, corona treatment and winding to form a three layers co-extrusion biaxially oriented polypropylene transparent film for in-mold label(as shown in the FIG. 2).

For the biaxial oriented polypropylene (BOPP) synthetic paper and transparent film for in-mold label according to this invention, the composition and thickness of the adhesive layer have close relation to the adhesion strength of the integral surface of bottle and jar; the adhesive layer is thicker, the adhesion is stronger. Also, if the material of bottle and jar is HDPE, the HDPE of the composition of the adhesive layer have to be increased.

The kinds and the characteristics of the material used in this invention will be described hereinafter, wherein the PP resin used in this invention are homopolymer with high crystallinity of melt flow index(MFI) 0.5~12 (230° C./2.16 kg, ASTM D 1238) and most of them are isotactic, and the MFI, the magnitude of molecular weight and the distribution state as well as the ratio of orientation will influence the mechanical strength and the thickness homogeneity of the synthetic paper. Additionally, the synthetic paper and transparent film can reach the imitation paper effect by matching polyethylene resin, inorganic powder, and the gloss, pen-writing influence and print availability can also be controlled by the using amount proportion. The polyethylene resin used in the paper layer is of grade of melt flow index (MFI) 0.1~14, and the polyethylene resin or the high density polyethylene resin used in the adhesive layer is of grade of melt flow index (MFI) 0.1~7, which is suitable for the biaxial oriented process.

The inorganic powder used in this invention mainly plays the function for significantly decreasing the specific gravity of the synthetic paper, to increase the hiding power and the heat resistance, and thus provide the paper layer of excellent printability; the inorganic powder can be one or more than two selected from the group of calcium carbonate, calcium silicate, talc powder, barium sulfate, diatomite and titanium oxide, and the particle size of inorganic powder ranges from 0.1 to 10 $\mu$m. The particle size and the used amount depends on the application and the quality of the product. While depending on the application of the product, the ultraviolet absorbent can be added and the used amount of titanium oxide can be increased to satisfy the requirement of weatherproof of the product.

The antistatic agent used in this invention could be the same as those used in the bi-axially oriented PP, in which tertiary amine, amide preferably used can eliminate the static effect caused in the coating process.

In order to prevent the mutual adhesion between the coating layers from occurring while coating and winding process, the antiblocking agent is required, and generally it may be such as silica, clay, polymethyl methacrylate (PMMA), glass bead.

The specific gravity of the BOPP synthetic paper according to this invention is ranges from 0.5 to 0.90, which can be adjusted by changing the composition formulation depending on the application and the cost of the product, such that can favors the consumers to use much more paper area on the basis of same unit weight, and to save money.

The specific gravity of the BOPP synthetic transparent film according to this invention is ranges from 0.89 to 0.93.

DESCRIPTION OF THE PREFERRED EMBODIMENTS

In order to understand the technical features of this invention, various characteristics and applications of 3-layer BOPP synthetic paper and transparent film made from PP compositions is shown as embodiment examples. We provide some embodiments to describe it in details. However, these examples cannot be explained as limitations of the scope of this invention.

Embodiment Example 1: BOPP synthetic paper of thickness 80, 100 μm with white haze paper layer (sample 1,2 enclosed)

PP resin (MFI=2.0) of 75% weight and antistatic agent of 5% weight is mixed and fed in the primary twin screw extruder from the feeding hopper, in the meanwhile, the calcium carbonate powder of 15% weight, and titanium oxide of 5% weight are fed into the twin screw primary extruders from the other side feeding hopper (the above is the section of the foamed intermediate layer); On the other way, PP resin (MFI=2.4) 65% weight, PF, resin 10% weight, antiblocking agent 2% weight, and ultraviolet absorbent 2% weight are mixed by a mixer and fed into the #1 twin screw secondary extruder of cylinder venting type from the side feeding hopper, in the meanwhile, the calcium carbonate powder of 15% weight and titanium oxide 5% weight are mixed by a mixer and fed into the #1 twin screw secondary extruder of cylinder venting type from the other side feeding hopper (the above is the section of the paper layer); Then PP resin (MFI=2.0) 80% weight and PF resin (MFI=1.0) 20% weight are mixed by a mixer and fed into the #2 twin screw secondary extruder of cylinder venting type from the side feeding hopper (the above is the section of the adhesive layer). At the extruder temperature of 200~280° C., these mixtures are extruded through the same one T-die by means of 3-layer co-extrusion, and then pass the cooling rollers at the temperature 15~60° C. Thus the PP coating sheet is cooled and shaped, then preheated at 120~150° C. and fed into the longitudinal orientation device for drawing 5 times for longitudinal orientation, then tempered and cooled, preheated and drawing 9 time for lateral orientation to enter into a lateral orientation device whose temperature set at 150~185° C., and, then tempered and cooled to control the shrinkage ratio of the thus obtained 3-layer synthetic paper. After this step, the 3-layer synthetic paper is subjected to corona treatment for better printability, finally taken up by winding machine. The BOPP synthetic paper of thickness 80 μm, 100 μm can be manufactured by the above method, and can be used in the mold to integrate with the bottle or jar of injection molding or blowing molding. The surface of the label may not shrink, has no air bubbles incurred, and can be securely adhered.

The physical properties of the BOPP synthetic paper in two different thickness of 80 μm (see attached sample 1) and 100 μm (see attached sample 2) made by this embodiment example are shown as following table.

| Item | Unit | Kind 80 μm | Kind 100 μm | Test Method |
|---|---|---|---|---|
| Specific gravity | — | 0.77 | 0.77 | ASTM D-1248 |
| Basic weight (weight per unit area) | g/cm² | 61.6 | 77 | JIS P-8124 |
| Gloss | % | 17 | 17 | TAPPI T-480 |
| Whiteness | % | 96 | 96 | TAPPI T-525 |
| Opaqueness | % | 91 | 93 | TAPPI T-425 |
| Roughness | μm | 0.9 | 0.9 | TAPPI T-555 |
| Surface resistivity | Ω | $10^{11}$ | $10^{11}$ | ASTM D257 |

Embodiment Example 2: BOPP synthetic paper of thickness 72, 92 μm with white gloss paper layer (sample 3,4 attached)

PP resin (MFI=2.0) of 70% weight and antistatic agent of 5% weight is mixed and fed in the primary twin screw extruder from the feeding hopper, in the meanwhile, the calcium carbonate powder of 20% weight, and titanium oxide of 5% weight are fed into the two screw primary extruders from the other side feeding hopper (the above is the section of the foamed intermediate layer); On the other way, PP resin (MFI=2.0) 95% weight, antiblocking agent 3% weight, and ultraviolet absorbent 2% weight are mixed by a mixer and fed into the #1 twin screw secondary extruder of cylinder venting type from the side feeding hopper (the above is the section of the gloss paper layer); Then PP resin (MFI=2.0) 80% weight and PE resin (MFI=10) 20% weight are mixed by a mixer and fed into the #2 twin screw secondary extruder of cylinder venting type from the side feeding hopper (the above is the section of the adhesive layer). At the extruder temperature of 200~280° C., these mixtures are extruded through the same one T-die by means of 3-layer co-extrusion, and then pass the cooling rollers at the temperature 15~65° C. Thus the PP coating sheet is cooled and shaped, then preheated at 120~150° C. and fed into the longitudinal orientation device for drawing 5 times for longitudinal orientation, then tempered and cooled, preheated and drawn 9 times for lateral orientation to enter into a lateral orientation device whose temperature set at 150~185° C., and, then tempered and cooled to control the shrinkage ratio of the thus obtained 3-layer synthetic paper. After this step, the 3-layer synthetic paper is subjected to corona treatment for better printability, finally taken up by winding machine. The BOPP synthetic paper of thickness 72 μm, 92 μm can be manufactured by the above method, and can be used in the mold to integrate with the bottle or jar of injection molding or blowing molding. The surface of the label may not shrink, has no air bubbles incurred, and can be securely adhered.

The physical properties of the white gloss BOPP synthetic paper in two different thickness of 72 μm (see attached sample 3) and 92 μm (see attached sample 4) made by this embodiment example are shown as following table.

| Item | Unit | Kind 72 μm | Kind 92 μm | Test Method |
|---|---|---|---|---|
| Specific gravity | — | 0.74 | 0.74 | ASTM D-1248 |
| Basic weight (weight per unit area) | g/cm² | 53.3 | 68.1 | JIS P-8124 |
| Gloss | % | 118 | 118 | TAPPI T-480 |
| Whiteness | % | 88 | 88 | TAPPI T-525 |

-continued

| Item | Unit | Kind | | Test Method |
|---|---|---|---|---|
| | | 72 μm | 92 μm | |
| Opaqueness | % | 73 | 86 | TAPPI T-425 |
| Roughness | μm | 0.4 | 0.5 | TAPPI T-555 |
| Surface resistivity | Ω | $10^{12}$ | $10^{12}$ | ASTM D257 |

Embodiment Example 3: biaxially-oriented BOPP synthetic transparent film of thickness 100 μm (sample 5 attached)

PP resin (MFI=2.0) of 95% weight and antistatic agent of 5% weight is mixed an fed in the primary single screw extruder from the feeding hopper; On the otherway, PP resin (MFI=2.0) 97% weight and antiblocking agent 3% weight are mixed by a mixer and fed into the #1 single screw secondary extruder from the feeding hopper; Then PP resin (MFI=2.0) 80% weight and PE resin (MFI=1.0) 20% weight are mixed by a mixer and fed into the #2 single screw secondary extruder from the feeding hopper. At the extruder temperature of 200~280° C., these mixtures are extruded through the same one T-die by means of 3-layer co-extrusion, and then pass the cooling rollers at the temperature 15~65° C. Thus the PP coating sheet is cooled and shaped, then preheated at 120~150° C. and fed into the longitudinal orientation device for drawing 5 times for longitudinal orientation, then tempered and cooled, preheated and drawn 9 times for lateral orientation to enter into a lateral orientation device whose temperature set at 150~185° C., and, then tempered and cooled to control the shrinkage ratio of the thus obtained 3-layer synthetic transparent film. After this step, the 3-layer synthetic transparent film is subjected to corona treatment for better printability, finally taken up by winding machine. The BOPP synthetic transparent film of thickness 100 μm can be manufactured by the above method, and can be used in the mold to integrate with the bottle or jar of injection molding or blowing molding. The surface of the label may not shrink, has no air bubbles incurred, and can be securely adhered.

The physical properties of the biaxially oriented BOPP synthetic transparent film in the thickness of 100 μm (see attached sample 5) made by this embodiment example are shown as following table.

| Item | Unit | Kind | Test Method |
|---|---|---|---|
| | | 100 μm | |
| Specific gravity | — | 0.91 | ASTM D-1248 |
| Basic weight (weight per unit area) | g/cm² | 91 | JIS P-8124 |
| Gloss | % | 145 | TAPPI T-480 |
| Roughness | μm | 0.3 | TAPPI T-555 |
| Surface resistivity | Ω | $10^{12}$ | ASTM D257 |

This invention has been shown and described in preferred form only, and by way of examples, and many variations may be made in the invention which will be comprised within its spirit. It is understood, therefore, that the invention is not limited to any specific form or embodiment except insofar as such limitations are included in the appended claims.

what is claimed is:

1. A process for producing a 3-layer co-extruded biaxial-oriented polypropylene (BOPP) transparent film for an in-mold label comprising:

(a) extruding by means of a first twin screw secondary extruder of cylinder venting type a top resin layer from a first resin composition comprising 77–97% by weight of a high crystallinity polypropylene having over 97% isotacticity 0–20% by weight of polyethylene, and 3–5% by weight of antiblocking agent;

(b) extruding by means of a twin screw primary extruder of cylinder venting type an intermediate layer from a second resin composition comprising 87–97% by weight of a high crystallinity polypropylene having over 97% isotacticity, 0–10% by weight of polyethylene, and 3–5% by weight of antistatic agent;

(c) extruding by means of a second twin screw secondary extruder of cylinder venting type an adhesive layer from a third resin composition comprising 50–100% by weight of a high crystallinity polypropylene having over 97% isotacticity 0–30% by weight of polyethylene, and 0–20% by weight of high density;

(d) extruding a co-flow through a T-die to form a BOPP transparent film with three layers comprising a top resin layer, an intermediate layer, and an adhesive layer, wherein said intermediate layer is formed from an extrudate from said twin screw primary extruder of cylinder venting type and said top resin layer and said adhesive layer is formed from an extrudate from said two twin screw secondary extruders of cylinder venting type;

(e) cooling and shaping said BOPP transparent film by passing through a cooling roller at 15 to 65° C., and being axially oriented for a draw ratio of 3–6 times of a longitudinal orientation through preheating, orienting and tempering under 115 to 150° C., and for a draw ratio 5–12 times of lateral orientation through preheating, orienting and tempering under 140 to 195° C.;

(f) treating said BOPP transparent film through corona discharge treatment with a high frequency wave under a power of 20–120 KW; and (g) taking up said BOPP transparent film by a winding device to form a roll of said BOPP transparent film of in-mold label.

2. A process for producing a 3-layer co-extruded biaxial-oriented polypropylene (BOPP) synthetic paper for an in-mold label comprising:

(a) extruding by means of a first twin screw secondary extruder of cylinder venting type a paper sheet layer from a first resin composition comprising 50–97% by weight of a high crystallinity polypropylene having over 97% isotacticity, 0–30% by weight of polyethylene, 0–5% by weight of antiblocking agent, 0–5% by weight of ultraviolet agent, 0–50% by weight of calcium carbonate powder and 0–20% by weight of titanium oxide separately into the feeding hopper and the side feeding hopper of said first twin screw secondary extruder;

(b) extruding by means of a twin screw primary extruder of cylinder venting type a foamed intermediate layer from a second resin composition comprising 45–95% by weight of a high crystallinity polypropylene having over 97% isotacticity 2–5% by weight of antistatic agent, 5–50% by weight of calcium carbonate and 5–10% by weight of titanium oxide separately into the feeding hopper and the side feeding hopper of said twin screw primary extruder;

(c) extruding by means of a second twin screw secondary extruder of cylinder venting type an adhesive layer from a third resin composition comprising 50–100% by weight of a high crystallinity polypropylene having over 97% isotacticity 0–30% by weight of polyethylene, and 0–20% by weight of high density polyethylene separately into the feeding hopper and the side feeding hopper of said second twin screw secondary extruder;

said first, second and third resin composition being extruded for co-flow at 180 to 280° C.;

(d) extruding said co-flow through a T-die to form a BOPP synthetic paper with three layers comprising a paper sheet layer, a foamed intermediate layer, and an adhesive layer, wherein said foamed intermediate layer is formed from an extrudate from said twin screw primary extruder of cylinder venting type and said paper sheet layer and said adhesive layer is formed from an extrudate from said two twin screw secondary extruders of cylinder venting type;

(e) cooling and shaping said BOPP transparent film by passing through a cooling roller at 15 to 65° C., and being axially oriented for a draw ratio of 3–6 times of a longitudinal orientation through preheating, orienting and tempering under 115 to 150° C., and for a draw ratio of 5–12 times of lateral orientation through preheating orienting and tempering under 140 to 195° C.;

(f) treating said BOPP synthetic paper through corona discharge treatment with a high frequency wave under a power of 20–120 KW; and (g) taking up said BOPP synthetic paper by a winding device to form a roll of said BOPP synthetic paper of haze paper sheet layer/foamed intermediate layer/adhesive layer, gloss paper sheet layer/foamed intermediate layer/adhesive layer of in-mold label.

* * * * *